(12) United States Patent
Sagona

(10) Patent No.: US 12,206,330 B2
(45) Date of Patent: Jan. 21, 2025

(54) RATE LIMITING FOR BUCK CONVERTERS

(71) Applicant: Hamilton Sundstrand Corporation, Charlotte, NC (US)

(72) Inventor: John Duward Sagona, Poplar Grove, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 291 days.

(21) Appl. No.: 17/717,752

(22) Filed: Apr. 11, 2022

(65) Prior Publication Data
US 2023/0327549 A1    Oct. 12, 2023

(51) Int. Cl.
*H02M 3/158* (2006.01)
*H02M 1/00* (2006.01)
*H02M 3/157* (2006.01)

(52) U.S. Cl.
CPC ......... *H02M 3/158* (2013.01); *H02M 1/0009* (2021.05); *H02M 3/157* (2013.01)

(58) Field of Classification Search
CPC ..... H02M 1/0009; H02M 3/157; H02M 3/158
See application file for complete search history.

(56) References Cited

U.S. PATENT DOCUMENTS

| | | | |
|---|---|---|---|
| 8,120,342 B1 | 2/2012 | Kahn et al. | |
| 8,248,052 B2 | 8/2012 | Sharma | |
| 8,605,469 B2 | 12/2013 | Swamy | |
| 8,929,106 B2 | 1/2015 | Reddy et al. | |
| 9,882,481 B2 | 1/2018 | Mascioli et al. | |
| 10,180,695 B1 | 1/2019 | Bikulcius | |
| 10,461,647 B2 | 10/2019 | Baurle et al. | |
| 10,622,897 B2 | 4/2020 | Sagona | |
| 10,845,833 B1 * | 11/2020 | Dietrich | H02M 3/157 |
| 2004/0174144 A1 | 9/2004 | Huang et al. | |
| 2009/0302816 A1 | 12/2009 | Kunimatsu | |
| 2014/0292292 A1 | 10/2014 | Koski | |
| 2016/0276931 A1 * | 9/2016 | Trichy | H02M 3/158 |
| 2016/0380537 A1 | 12/2016 | Bizjak et al. | |
| 2017/0070149 A1 | 3/2017 | Guan et al. | |
| 2018/0006560 A1 | 1/2018 | Mascioli et al. | |
| 2020/0099304 A1 * | 3/2020 | Sasao | H02M 3/1584 |
| 2022/0103069 A1 | 3/2022 | Chiang | |

FOREIGN PATENT DOCUMENTS

CN    113489318 A    10/2021

OTHER PUBLICATIONS

Extended European Search Report dated Sep. 7, 2023, issued during the prosecution of European Patent Application No. EP 23167427.6.

* cited by examiner

*Primary Examiner* — Jue Zhang
*Assistant Examiner* — Lakaisha Jackson

(57) ABSTRACT

A method of DC-DC power conversion includes converting a DC link voltage to a DC output voltage for a load that is lower than the DC link voltage using a buck converter. The method includes controlling the buck converter in a normal switching mode in response to the DC link voltage being below a predetermined high threshold. The method also includes controlling the buck converter in a rate limited switching mode in response to the DC link voltage being at or above the predetermined high threshold.

20 Claims, 2 Drawing Sheets

RATE LIMITING FOR BUCK CONVERTERS

BACKGROUND

1. Field

The present disclosure relates to power conversion, and more particularly to buck converters for stepping an input voltage down to a lower output voltage.

2. Description of Related Art

Buck converters can be used to step an input or link voltage down to a lower output voltage. Synchronous and/or standard buck power converters with a wide input range, e.g. 90 VDC to 600 VDC, which is a much wider input range than in traditional applications, have a large range of forward control gain. The high forward control gain can be enough to make the traditional power converter unstable and more susceptible to load disturbances (especially load transients).

The conventional techniques have been considered satisfactory for their intended purpose. However, there is an ever present need for improved systems and methods for improving forward control gain in buck converters. This disclosure provides a solution for this need.

SUMMARY

A method of DC-DC power conversion includes converting a DC link voltage to a DC output voltage for a load that is lower than the DC link voltage using a buck converter. The method includes controlling the buck converter in a normal switching mode in response to the DC link voltage being below a predetermined high threshold. The method also includes controlling the buck converter in a rate limited switching mode in response to the DC link voltage being at or above the predetermined high threshold.

Controlling the buck converter in the rate limited switching mode can include latching the rate limited switching mode in an enabled state upon occurrence of the DC link voltage being at or above the predetermined high threshold, to keep the rate limited switching mode enabled even if the DC link voltage drops below the predetermined high threshold after latching. The method can include resetting the enabled state of the rate limiting switching mode upon detection of occurrence of the DC link voltage being at or below a predetermined low threshold. The method can include disabling the rate limited switching mode upon occurrence of the DC link voltage being at or above the predetermined high threshold and a delayed occurrence of the DC link voltage being at or below the predetermined low threshold.

Controlling the buck converter in the normal switching mode can include controlling current to the load based on measured current supplied to the buck converter at the DC Link Voltage, and a commanded inductor current for controlling current in a main inductor of the buck converter. The commanded inductor current for controlling the current in the main inductor can be derived from a voltage control signal that is based on a differential of commanded output voltage and measured output voltage to the load.

Controlling the buck converter in the rate limiting mode can include controlling current to the load based on measured current supplied to the buck converter at the DC Link Voltage, and a commanded inductor current for controlling current in a main inductor of the buck converter. The commanded inductor current for controlling the current in the main inductor can be derived from a peak inductor current limiting function that outputs the commanded inductor current on a rate limited basis relative to the normal switching mode based on a differential of commanded output voltage and measured output voltage to the load.

A DC-DC conversion system includes a buck converter configured to receive a DC link voltage as input and to output a DC output voltage that is lower than the DC link voltage. A controller is operatively connected to the buck converter to control the buck converter. The controller includes logic configured to control the buck converter in a normal switching mode in response to the DC link voltage being below a predetermined high threshold. The controller includes logic configured to control the buck converter in a rate limited switching mode in response to the DC link voltage being at or above the predetermined high threshold.

The buck converter can includes a positive DC link voltage node and a negative DC link voltage node. A switching component can connect the positive and negative DC link voltage nodes.

The controller can be operatively connected to control switching of the switching component. The switching component can include a pair of switches connected in series. The buck converter can include a main inductor connecting a node between the two switches to a positive DC output node.

A first reluctance can be included, namely the winding resistance of the main inductor. A second reluctance can be connected in series between the positive DC output node and the negative DC link voltage node. The negative DC link voltage node can be configured to serve as a negative DC output node. An input capacitor can connect between the positive and negative DC link voltage nodes in parallel with the switching component.

A first current sensor can be operatively connected to provide input indicative of current through the positive DC output node to a current control logic component of the controller. The current control logic component can be operatively connected to control switching of the switching component. A first voltage sensor can be operatively connected to provide input indicative of voltage across the positive DC output node and the negative DC link voltage node to the controller. A second voltage sensor can be operatively connected to provide input indicative of voltage across the positive and negative DC link voltage nodes to the controller.

A differential logic component can be operatively connected to output a differential signal indicative of difference between the input from the first voltage sensor and a commanded output voltage to a voltage control logic component configured to output a voltage control signal based on the differential signal. A rate limiter can be operatively connected to output a rate limiting signal based on the voltage control signal. A switch logic component can be operatively connected to receive input from the rate limiter and from the voltage control logic component. The switch logic component can be configured two switch between sending output from the rate limiter or from the voltage control logic component to the current control logic component. A rate limiter logic component can be operatively connected to receive input from the second voltage sensor, and to control the switch logic component between the rate limiting switching mode and the normal switching mode.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

Figure 2:
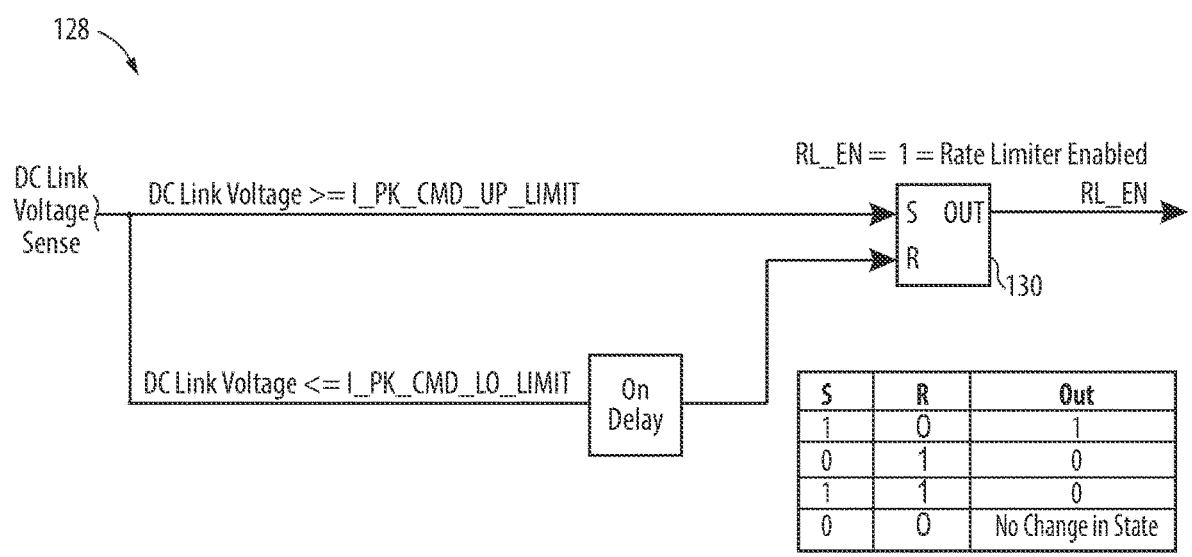
FIG. 2 is a schematic view of the logic in the controller of FIG. 1 for enabling and disabling the rate limiting mode based on the logic states shown in TABLE 1.

TABLE 1 shows the logic states for the set/reset logic component of FIG. 2.

DETAILED DESCRIPTION OF THE PREFERRED EMBODIMENTS

Figure 1:
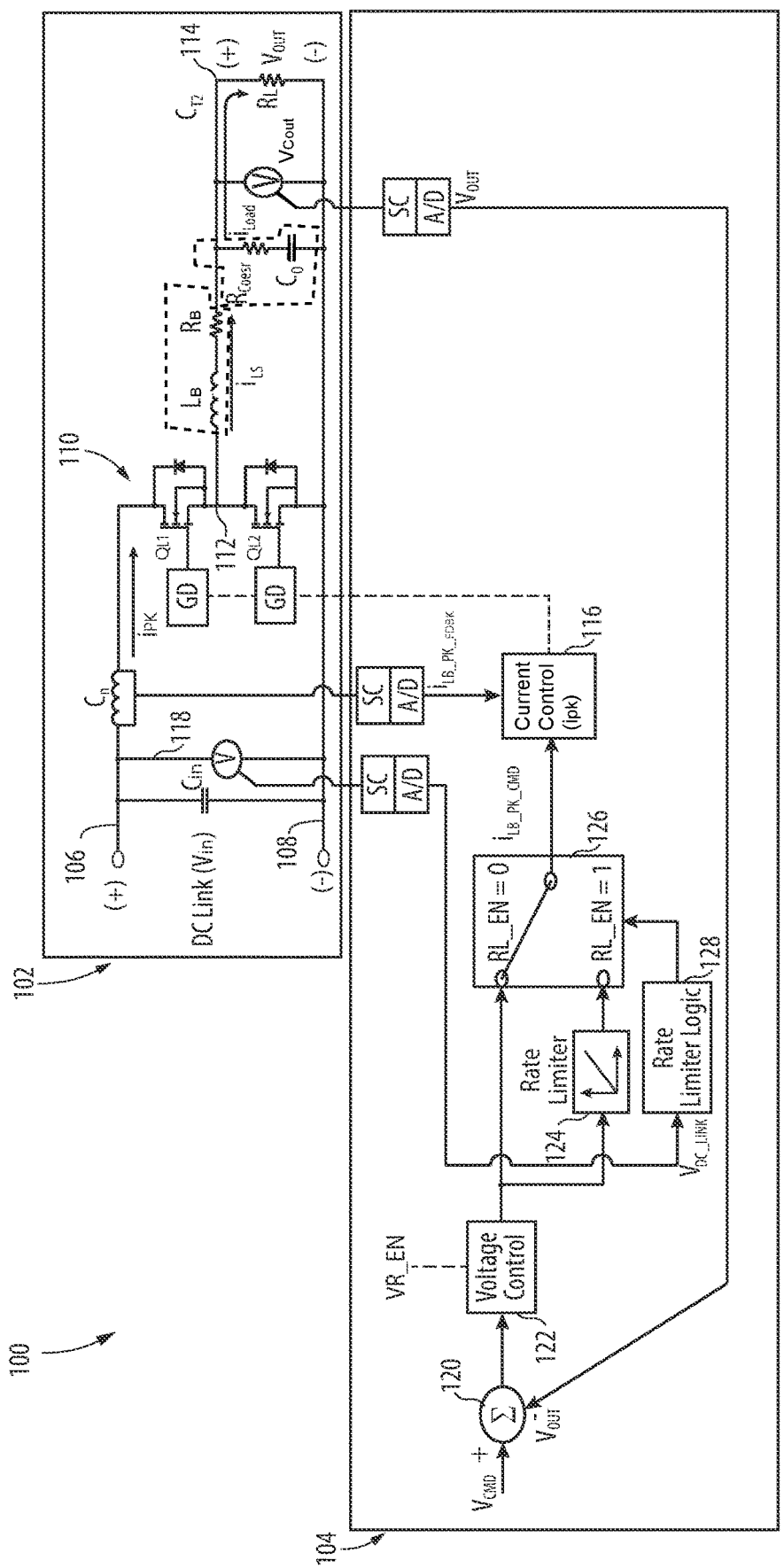
FIG. 1 is a schematic view of an embodiment of a system constructed in accordance with the present disclosure, showing the buck converter and the controller.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIG. 2 and TABLE 1, as will be described. The systems and methods described herein can be used to overcome traditional problems with high forward control gain in synchronous/standard buck power converters with wide input voltage ranges, e.g. where the input voltage ranges from 90 VDC to 600 VDC.

The DC-DC conversion system 100 includes a buck converter 102 configured to receive a DC link voltage as input and to output a DC output voltage that is lower than the DC link voltage. A controller 104 is operatively connected to the buck converter 102 to control the buck converter 102. The controller 104 includes logic configured to control the buck converter 102 in a normal switching mode in response to the DC link voltage being below a predetermined high threshold. The controller 104 also includes logic configured to control the buck converter 102 in a rate limited switching mode in response to the DC link voltage being at or above the predetermined high threshold.

The buck converter 102 includes a positive DC link voltage node 106 and a negative DC link voltage node 108. A switching component 110 connects the positive and negative DC link voltage nodes 106, 108. The controller 104 is operatively connected to control switching of the switching component 110. The switching component 110 includes a pair of switches $Q_1$ and $Q_2$ connected in series across the positive and negative DC link voltage nodes 106, 108. The switching components $Q_1$ and $Q_2$ can be any suitable type of switches, such as solid state switches where the gates are connected to the controller 104 so the controller 104 can control the switching of the switching components to produce the output voltage at the DC output nodes 114, 108.

The buck converter 102 includes a main inductor $L_B$ connecting a node 112 between the two switches $Q_1$ and $Q_2$ to a positive DC output node 114. A first reluctance indicated with a dashed box in FIG. 1 includes the main inductor $L_B$, wherein $R_B$ is the winding resistance of the main inductor $L_B$. A second reluctance (the capacitor CO and its associated internal resistance, $R_{C_{oesr}}$ as indicated by a dashed line box around them in FIG. 1) is connected across the positive DC output node 114 and the negative DC link voltage node 108, which is configured to serve as a negative DC output node. The second reluctance is connected in parallel with the load (represented in FIG. 1 by $R_L$). Those skilled in the art will readily appreciate that the load is not necessarily part of the buck converter 102, and can be any suitable load to be powered by the output voltage and current of the cuck converter 102. An input capacitor $C_{in}$ connects between the positive and negative DC link voltage nodes 106, 108 in parallel with the switching component 110.

With continued reference to FIG. 1, the controller 104 is described now in additional detail. A first current sensor $C_{T1}$ is operatively connected to provide input indicative of current through the positive DC link voltage node 106 to the current control logic component 116 of the controller 102. The current control logic component 116 is operatively connected to control switching of the switching component 110, e.g. the component 116 connects to the gates of the switches $Q_1$ and $Q_2$. A first voltage sensor $V_{OUT}$ is operatively connected to provide input indicative of voltage across the positive DC output node 114 and the negative DC link voltage node 108 to the controller 102. A second voltage sensor 118 is operatively connected to provide input indicative of voltage ($V_{DC\_LINK}$) across the positive and negative DC link voltage nodes 106, 108 to the controller 102.

A differential logic component 120 is operatively connected to output a differential signal indicative of difference between the output from the first voltage sensor $V_{OUT}$ and a commanded voltage ($V_{CMD}$) to a voltage control logic component 122 that is configured to output a voltage control signal based on the differential signal. The control algorithm inside block 122 can be a standard control algorithm, i.e. a proportional plus integral, although any other suitable type of control algorithm can be used. A rate limiter 124, e.g. a logic component for limiting current rate through the main inductor $L_B$, is operatively connected to output a rate limiting signal based on the voltage control signal from the voltage control logic component 122. A switch logic component 126 is operatively connected to receive input from a rate limiter logic component 128 and from the voltage control logic component 122. The switch logic component 126 is configured to switch between sending output from the rate limiter 124 or from the voltage control logic component 122 to the current control logic component 116. The rate limiter logic component 128 is operatively connected to receive input ($V_{DC\_LINK}$) from the second voltage sensor 118, and to control the switch logic component 126 between the rate limiting switching mode and the normal switching mode, which are further discussed below.

A method of DC-DC power conversion includes converting a DC link voltage to a DC output voltage for a load, e.g. $R_L$, that is lower than the DC link voltage using a buck converter, e.g. buck converter 102. The method includes controlling the buck converter in a normal switching mode in response to the DC link voltage being below a predetermined high threshold. The method also includes controlling the buck converter in a rate limited switching mode in response to the DC link voltage being at or above the predetermined high threshold.

With reference to FIG. 2, the logic of the switch logic component 126 is now described with reference to the methods of operating the system 100 of FIG. 1. Controlling the buck converter in the rate limited switching mode includes latching the rate limited switching mode in an enabled state, e.g. RL_EN=1 in FIG. 2, upon occurrence of the DC link voltage being at or above the predetermined high threshold (DC LINK Voltage>=I_PK_CMD_UP_LIMIT=1 in FIG. 2), to keep the rate limited switching mode enabled even if the DC link voltage drops below the predetermined high threshold after latching. This is represented in FIG. 2, and TABLE 1, with the state of the S input to the set/reset logic component 130 being having a value of 1, and the R input of the set/reset logic component 130 having a value of 0, which gives the output (RL_EN) from the set/reset logic component 130 a value of 1. This puts the switching logic component 126 of FIG. 1 in the rate limiting switching mode for the switches $Q_1$ and $Q_2$. Those skilled in the art will readily appreciate that any suitable method can be used to regulate the peak inductor current for block 116 of FIG. 1.

The method includes resetting the enabled state of the rate limiting switching mode upon detection of occurrence of the DC link voltage being at or below a predetermined low threshold (DC LINK Voltage<=I_PK_CMD_LO_LIMIT=1 in FIG. 2). This is represented in FIG. 2, and TABLE 1, with the state of the S input of the set/reset logic component 130 having a value of either 0 or 1, and with the state of the R input having a value of 1, which gives the output (RL_EN) from the set/reset logic component 130 a value of 0. This puts the switching logic component 126 of FIG. 1 in the normal switching mode for the switches $Q_1$ and $Q_2$. I_PK_CMD_LO_LIMIT and I_PK_CMD_UP_LIMIT are designed values for a given application.

The method includes disabling the rate limited switching mode (RL_EN=0 in FIG. 2) upon occurrence of the DC link voltage being at or above the predetermined high threshold and a delayed occurrence of the DC link voltage being at or below the predetermined low threshold. The purpose of the delay box in the logic diagram of FIG. 2 is to prevent toggling modes after rapid DC link oscillations outside the high and low thresholds, i.e. to filter out noise. As shown in TABLE 1, if the R and S inputs to the set/reset logic component 130 are both 0, then there is no change to the output of the set/reset logic component 130. In this state, the switching logic component 126 of FIG. 1 will maintain whichever of the switching modes it is already in for the switches $Q_1$ and $Q_2$.

With reference again to FIG. 1, controlling the buck converter 102 in the normal switching mode includes controlling current to the load based on measured current supplied to the buck converter at the DC Link Voltage, as an input from the current sensor $C_{T1}$ to the current logic control component 116, and based on a commanded inductor current, e.g. the output from the voltage control logic component 122, for controlling current in a main inductor, e.g. $L_B$, of the buck converter. The commanded inductor current for controlling the current in the main inductor is derived from a voltage control signal that is based on a differential of commanded output voltage and measured output voltage to the load, e.g. using the differential logic component 120.

With continued reference to FIG. 1, controlling the buck converter in the rate limiting mode includes controlling current to the load based on measured current supplied to the buck converter at the DC Link Voltage, e.g. as an input from the current sensor $C_{T1}$ to the current logic control component 116, and based on a commanded inductor current for controlling current in a main inductor of the buck converter. In this rate limiting mode, the commanded inductor current for controlling the current in the main inductor is derived from a peak inductor current limiting function, e.g. in the rate limiter 124, that outputs the commanded inductor current on a rate limited basis relative to the normal switching mode. The output of the rate limiter 124 is based on a differential of commanded output voltage and measured output voltage to the load, e.g. the output of the differential logic component 120.

Systems and method as disclosed herein have the potential to improve the high forward gain control for buck converters relative to more traditional techniques. This in turn can help make power converters more stable and less susceptible to load disturbances, e.g. load transients.

As will be appreciated by those skilled in the art, aspects of the present embodiments may be embodied as a system, method or computer program product. Accordingly, aspects of the present embodiments may take the form of an entirely hardware embodiment, an entirely software embodiment (including firmware, resident software, micro-code, etc.) or an embodiment combining software and hardware aspects that may all generally be referred to herein as a "circuit," "module," "component" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in a flowchart and/or block diagram block or blocks.

The methods and systems of the present disclosure, as described above and shown in the drawings, provide for overcoming traditional problems with high forward control gain in synchronous/standard buck power converters with wide input voltage ranges, e.g. where the input voltage ranges from 90 VDC to 600 VDC. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of DC-DC power conversion comprising:
   converting a DC link voltage to a DC output voltage for a load that is lower than the DC link voltage using a buck converter;
   controlling the buck converter in a normal switching mode in response to the DC link voltage being below a predetermined high threshold; and
   controlling the buck converter in a rate limiting switching mode in response to the DC link voltage being at or above the predetermined high threshold;
   wherein controlling the buck converter in the rate limiting switching mode includes controlling a current to the load based on a measured current supplied to the buck converter at the DC link voltage and a commanded inductor current for controlling a current in a main inductor of the buck converter; and
   wherein the commanded inductor current for controlling the current in the main inductor of the buck converter is derived from a peak inductor current limiting function that outputs the commanded inductor current on a rate limited basis relative to the normal switching mode based on a differential of a commanded output voltage and a measured output voltage to the load.

2. The method as recited in claim 1, wherein controlling the buck converter in the rate limiting switching mode further includes latching the rate limiting switching mode in an enabled state upon occurrence of the DC link voltage being at or above the predetermined high threshold to keep the rate limiting switching mode enabled even if the DC link voltage drops below the predetermined high threshold after latching.

3. The method as recited in claim 2, further comprising:
   resetting the enabled state of the rate limiting switching mode upon detection of occurrence of the DC link voltage being at or below a predetermined low threshold.

4. The method as recited in claim 3, further comprising disabling the rate limiting switching mode upon occurrence of the DC link voltage being at or above the predetermined high threshold and a delayed occurrence of the DC link voltage being at or below the predetermined low threshold.

5. A DC-DC conversion system comprising:
   a buck converter configured to receive a DC link voltage as input and to output a DC output voltage for a load that is lower than the DC link voltage; and
   a controller operatively connected to the buck converter to control the buck converter, wherein the controller includes logic configured to:
      control the buck converter in a normal switching mode in response to the DC link voltage being below a predetermined high threshold; and
      control the buck converter in a rate limiting switching mode in response to the DC link voltage being at or above the predetermined high threshold;
   wherein, to control the buck converter in the normal switching mode, the controller is configured to control a current to the load based on a measured current supplied to the buck converter at the DC Link voltage and a commanded inductor current for controlling a current in a main inductor of the buck converter; and
   wherein the commanded inductor current for controlling the current in the main inductor of the buck converter is derived from a voltage control signal that is based on a differential of a commanded output voltage and a measured output voltage to the load.

6. The DC-DC conversion system as recited in claim 5, wherein the buck converter includes a positive DC link voltage node and a negative DC link voltage node with a switching component connecting the positive and negative DC link voltage nodes, wherein the controller is operatively connected to control switching of the switching component.

7. The DC-DC conversion system as recited in claim 6, wherein the switching component includes a pair of switches connected in series, wherein the main inductor connects a node between the two switches to a positive DC output node.

8. The DC-DC conversion system as recited in claim 7, further comprising:
   a first reluctance, the first reluctance including an inductor winding resistance of the main inductor;

a second reluctance connected in series between the positive DC output node and the negative DC link voltage node, wherein the negative DC link voltage node is configured to serve as a negative DC output node; and an input capacitor connecting between the positive and negative DC link voltage nodes in parallel with the switching component.

9. The DC-DC conversion system as recited in claim 8, further comprising:
a first current sensor operatively connected to provide input indicative of current through the positive DC output node to a current control logic component of the controller, wherein the current control logic component is operatively connected to control the switching of the switching component.

10. The DC-DC conversion system as recited in claim 9, further comprising:
a first voltage sensor operatively connected to provide input indicative of voltage across the positive DC output node and the negative DC link voltage node to the controller; and
a second voltage sensor operatively connected to provide input indicative of voltage across the positive and negative DC link voltage nodes to the controller.

11. The DC-DC conversion system as recited in claim 10, further comprising:
a differential logic component operatively connected to output a differential signal indicative of difference between the input from the first voltage sensor and the commanded output voltage to a voltage control logic component configured to output the voltage control signal based on the differential signal;
a rate limiter operatively connected to output a rate limiting signal based on the voltage control signal;
a switch logic component operatively connected to receive input from the rate limiter and from the voltage control logic component, wherein the switch logic component is configured to switch between sending output from the rate limiter or from the voltage control logic component to the current control logic component; and
a rate limiter logic component operatively connected to receive input from the second voltage sensor and to control the switch logic component between the rate limiting switching mode and the normal switching mode.

12. The DC-DC conversion system of claim 9, wherein:
to control the buck converter in the rate limiting switching mode, the controller is configured to control the current to the load based on the measured current supplied to the buck converter at the DC link voltage and the commanded inductor current for controlling the current in the main inductor of the buck converter; and
the commanded inductor current for controlling the current in the main inductor of the buck converter is derived from a peak inductor current limiting function that outputs the commanded inductor current on a rate limited basis relative to the normal switching mode based on the differential of the commanded output voltage and the measured output voltage to the load.

13. The DC-DC conversion system of claim 12, wherein, to control the buck converter in the rate limiting switching mode, the controller is configured to latch the rate limiting switching mode in an enabled state upon occurrence of the DC link voltage being at or above the predetermined high threshold and to keep the rate limiting switching mode enabled even if the DC link voltage drops below the predetermined high threshold after latching.

14. The DC-DC conversion system of claim 13, wherein the controller is further configured to reset the enabled state of the rate limiting switching mode upon detection of occurrence of the DC link voltage being at or below a predetermined low threshold.

15. The DC-DC conversion system of claim 14, wherein the controller is further configured to disable the rate limiting switching mode upon occurrence of the DC link voltage being at or above the predetermined high threshold and a delayed occurrence of the DC link voltage being at or below the predetermined low threshold.

16. A method of DC-DC power conversion comprising:
converting a DC link voltage to a DC output voltage for a load that is lower than the DC link voltage using a buck converter;
controlling the buck converter in a normal switching mode in response to the DC link voltage being below a predetermined high threshold; and
controlling the buck converter in a rate limiting switching mode in response to the DC link voltage being at or above the predetermined high threshold;
wherein controlling the buck converter in the normal switching mode includes controlling a current to the load based on:
a measured current supplied to the buck converter at the DC link voltage, and
a commanded inductor current for controlling current in a main inductor of the buck converter; and
wherein the commanded inductor current for controlling the current in the main inductor of the buck converter is derived from a voltage control signal that is based on a differential of a commanded output voltage and a measured output voltage to the load.

17. The method of claim 16, wherein controlling the buck converter in the rate limiting mode includes controlling the current to the load based on:
the measured current supplied to the buck converter at the DC link voltage, and
the commanded inductor current for controlling current in the main inductor of the buck converter.

18. The method of claim 17, wherein the commanded inductor current for controlling the current in the main inductor of the buck converter is derived from a peak inductor current limiting function that outputs the commanded inductor current on a rate limited basis relative to the normal switching mode based on the differential of the commanded output voltage and the measured output voltage to the load.

19. The method of claim 16, wherein controlling the buck converter in the rate limiting switching mode includes latching the rate limiting switching mode in an enabled state upon occurrence of the DC link voltage being at or above the predetermined high threshold to keep the rate limiting switching mode enabled even if the DC link voltage drops below the predetermined high threshold after latching.

20. The method of claim 19, further comprising:
resetting the enabled state of the rate limiting switching mode upon detection of occurrence of the DC link voltage being at or below a predetermined low threshold.

* * * * *